United States Patent
Farmer et al.

(10) Patent No.: US 11,493,638 B2
(45) Date of Patent: Nov. 8, 2022

(54) CARRIER PHASE BASED MULTIPATH (MP) DETECTION

(71) Applicant: QUALCOMM Incorporated, San Diego, CA (US)

(72) Inventors: Dominic Gerard Farmer, San Jose, CA (US); Qingwen Zhang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/034,255

(22) Filed: Sep. 28, 2020

(65) Prior Publication Data

US 2022/0099841 A1 Mar. 31, 2022

(51) Int. Cl.
*G01S 19/22* (2010.01)
*G01S 19/29* (2010.01)

(52) U.S. Cl.
CPC .............. *G01S 19/22* (2013.01); *G01S 19/29* (2013.01)

(58) Field of Classification Search
CPC ...... G01S 19/22; G01S 19/243; G01S 19/246; G01S 19/29
See application file for complete search history.

(56) References Cited

U.S. PATENT DOCUMENTS

| | | | |
|---|---|---|---|
| 5,537,121 A | 7/1996 | Lennen | |
| 2010/0246644 A1 | 9/2010 | Farmer et al. | |
| 2011/0007783 A1* | 1/2011 | Weill | G01S 19/254 375/150 |
| 2017/0090037 A1* | 3/2017 | Ledvina | G01S 19/29 |
| 2020/0096647 A1* | 3/2020 | Cookman | G01S 19/246 |

OTHER PUBLICATIONS

B.W. Parkinson et al., Global Positioning System: Theory and Applications, vol. I; Progress in Astronautics and Aeronautics, vol. 163, American Institute of Aeronautics and Astronautics, Inc., p. 329-407, 1996 (Year: 1996).*
T. Pany et al., Coherent Integration Time: The Longer, the Better, InsideGNSS, p. 52-61, Nov./Dec. 2009 (Year: 2009).*
Mubarak, et al., "Analysis of Early Late Phase for Multipath Mitigation", GNSS 2008—Proceedings of the 21st International Technical Meeting Of The Satellite Division Of The Institute Of Navigation (ION GNSS 2008), The Institute Of Navigation, 8551 Rixlew Lane Suite 360 Manassas, VA 20109, USA, Sep. 19, 2008 (Sep. 19, 2008), pp. 669-678, XP056002723, 10 Pages, p. 669-p. 672.
Partial International Search Report—PCT/US2021/043856—ISA/EPO—dated Dec. 9, 2021.
International Search Report and Written Opinion—PCT/US2021/043856—ISA/EPO—dated Mar. 2, 2022.

* cited by examiner

*Primary Examiner* — Bernarr E Gregory
*Assistant Examiner* — Fred H Mull
(74) *Attorney, Agent, or Firm* — Qualcomm Incorporated

(57) ABSTRACT

A multipath (MP) carrier phase detector is disclosed that uses phase differences in the output of Early/Prompt/Late (EPL) correlation for MP detection. Embodiments may take coherent integrations of EPL correlator outputs and determine the respective carrier phase of each output. Phase differences can then be computed, and integer cycles and biases can be removed. MP can then be identified if a maximum phase difference of the EPL correlator outputs are determined to be above a certain threshold. According to some embodiments, false positives may be reduced by averaging phases and/or phase differences over a plurality of samples, and/or if a threshold number of consecutive MP detections have been made.

27 Claims, 7 Drawing Sheets

CARRIER PHASE BASED MULTIPATH (MP) DETECTION

BACKGROUND

Global Navigation Satellite Systems (GNSS) positioning can provide accurate positioning of a GNSS receiver in open sky scenarios. However, the performance of GNSS drastically degrades if large parts of the sky are obstructed. This occurs, for example, in so-called "urban canyon" scenarios, where GNSS-based estimated positions may be off by as much as a few hundred meters. These large positioning errors can be prohibitive in various applications, such as vehicular automation and/or navigation.

One cause for these large positioning errors in GNSS-based positioning is measurements from satellite signals suffering from multipath (MP). MP signals comprise one or more reflected signals that may travel a path up to hundreds of meters longer than signals traveling a direct path between the satellite and the GNSS receiver. Accordingly, when used, MP signals can result in significant inaccuracies in the positioning of the GNSS receiver. Thus, detecting and excluding such multipath signals can drastically increase positioning performance.

BRIEF SUMMARY

Embodiments disclosed herein provide for a MP carrier phase detector that uses carrier phase differences in the output of Early/Prompt/Late (EPL) correlation for MP detection. Embodiments may take coherent integrations of EPL correlator outputs and determine the respective carrier phase of each output. Carrier phase differences can then be computed and integer cycles and biases can be removed. MP can then be identified if a maximum phase difference of the EPL correlator outputs are determined to be above a certain threshold. According to some embodiments, false positives may be reduced by averaging phases and/or phase differences over a plurality of samples or utilizing other means.

An example method of MP detection in a GNSS receiver, according to this disclosure, comprises receiving, with the GNSS receiver, a radio frequency (RF) signal from a GNSS satellite, and obtaining EPL correlation outputs from correlations of the received RF signal, wherein the correlation outputs comprise (i) an Early output, (ii) a Prompt output, and (iii) a Late output, and each correlation output includes respective carrier phase component indicative of a carrier phase of the respective correlation output. The method further comprises obtaining a plurality of carrier phase differences by, for each pair of correlation outputs, determining a carrier phase difference based on the carrier phases of the correlation outputs in the respective pair of correlation outputs, determining whether MP is present in the RF signal based at least in part on the plurality of carrier phase differences, and providing, at the GNSS receiver, an indication of the determination of whether MP is present.

An example GNSS receiver, according to this disclosure, comprises an antenna configured to receive a RF signal from a GNSS satellite, and one or more EPL correlators configured to provide correlation outputs from correlations of the received the RF signal, wherein the correlation outputs comprise (i) an Early output, (ii) a Prompt output, and (iii) a Late output, and each correlation output includes respective carrier phase component indicative of a carrier phase of the respective correlation output. The GNSS receiver further comprises a carrier phase MP detector configured to obtain a plurality of carrier phase differences by, for each pair of correlation outputs, determining a carrier phase difference based on the carrier phases of the correlation outputs in the respective pair of correlation outputs, determine whether MP is present in the RF signal based at least in part on the plurality of carrier phase differences, and provide an indication of the determination of whether MP is present.

An example device for providing MP detection in a GNSS receiver comprises means for receiving a RF signal from a GNSS satellite, and means for obtaining EPL correlation outputs from correlations of the received the RF signal, wherein the correlation outputs comprise (i) an Early output, (ii) a Prompt output, and (iii) a Late output, and each correlation output includes respective carrier phase component indicative of a carrier phase of the respective correlation output. The device further comprises means for obtaining a plurality of carrier phase differences by, for each pair of correlation outputs, determining a carrier phase difference based on the carrier phases of the correlation outputs in the respective pair of correlation outputs, means for determining whether MP is present in the RF signal based at least in part on the plurality of carrier phase differences, and means for providing an indication of the determination of whether MP is present.

An example non-transitory computer-readable medium, according to this disclosure, has having instructions stored thereby for MP detection in a GNSS receiver, wherein the instructions, when executed by one or more processing units, cause the one or more processing units to perform functions including obtaining EPL correlation outputs from correlations of an RF signal received at the GNSS receiver, wherein the correlation outputs comprise (i) an Early output, (ii) a Prompt output, and (iii) a Late output, and each correlation output includes respective carrier phase component indicative of a carrier phase of the respective correlation output. The instructions, when executed by one or more processing units, further cause the one or more processing units to perform functions including obtaining a plurality of carrier phase differences by, for each pair of correlation outputs, determining a carrier phase difference based on the carrier phases of the correlation outputs in the respective pair of correlation outputs, determining whether MP is present in the RF signal based at least in part on the plurality of carrier phase differences, and providing, at the GNSS receiver, an indication of the determination of whether MP is present.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

As described herein, a GNSS receiver may comprise and/or be incorporated into an electronic device. This may include a single entity or may include multiple entities such as in a personal area network where a user may employ audio, video and/or data I/O devices and/or body sensors and a separate wireline or wireless modem. As described herein, an estimate of a location of the GPS receiver may be referred to as a location, location estimate, location fix, fix, position, position estimate or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

Figure 1:
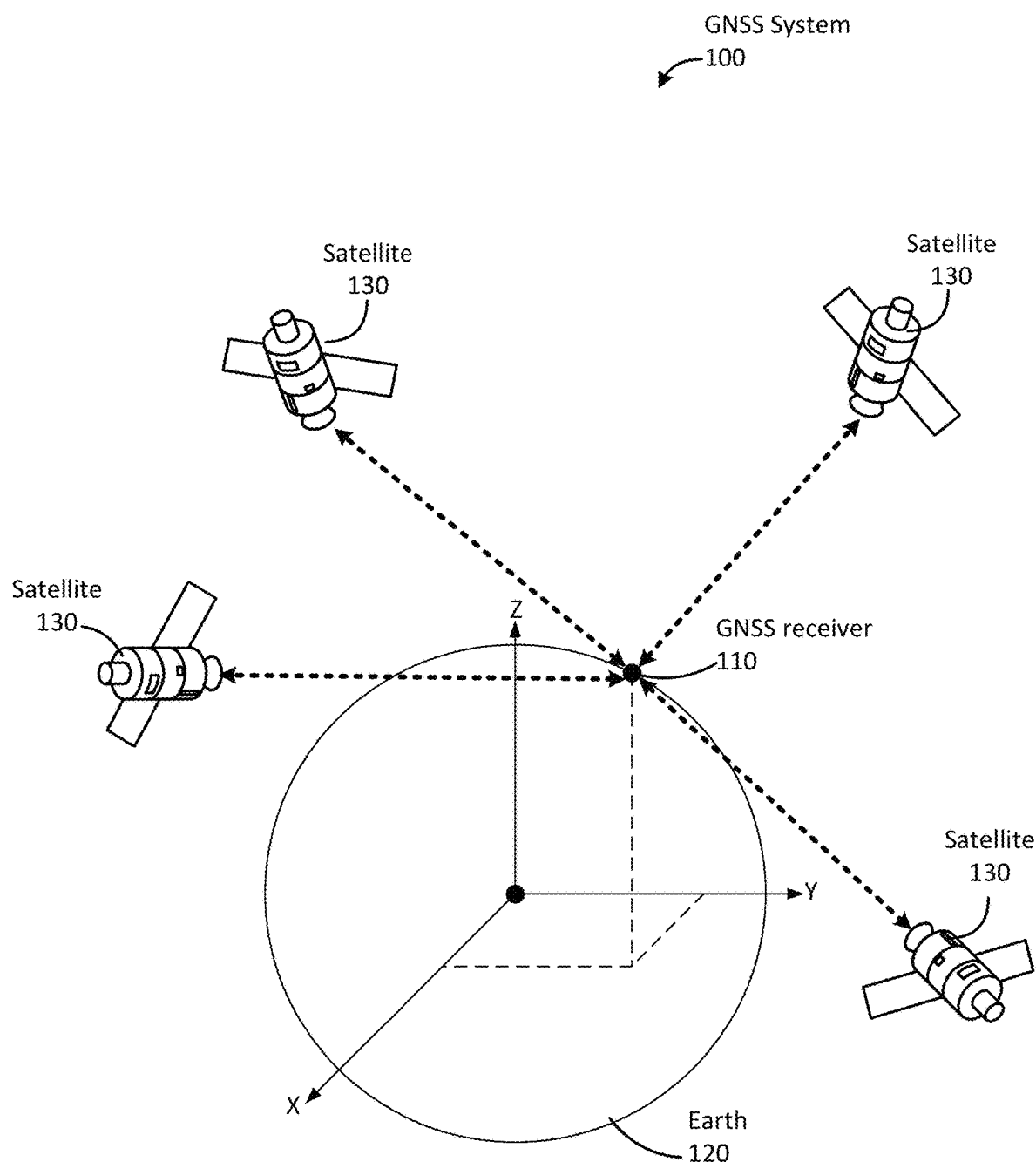
FIG. 1 is a simplified diagram of a GNSS system, according to an embodiment.

FIG. 1 is a simplified diagram of a GNSS system 100, provided to illustrate how GNSS is generally used to determine an accurate location of a GNSS receiver 110 on earth 120. Put generally, the GNSS system 100 enables an accurate GNSS position fix of the GNSS receiver 110, which receives RF signals from GNSS satellites 130 from one or more GNSS constellations. The types of GNSS receiver 110 used may vary, depending on application. In some embodiments, for instance, the GNSS receiver 110 may comprise consumer electronics or devices, such as a mobile phone, tablet, laptop, wearable device, vehicle (or on-vehicle device), or the like. In some embodiments, the GNSS receiver 110 may comprise industrial or commercial equipment, such as survey equipment.

It will be understood that the diagram provided in FIG. 1 is greatly simplified. In practice, there may be dozens of satellites 130 and a given GNSS constellation, and there are many different types of GNSS systems. GNSS systems include, for example, Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 110 in three dimensions may rely on a determination of the distance between the GNSS receiver 110 and four or more satellites 130. As illustrated, 3D coordinates may be based on a coordinate system (e.g., XYZ coordinates; latitude, longitude, and altitude; etc.) centered at the earth's center of mass. A distance between each satellite 130 and the GNSS receiver 110 may be determined using precise measurements made by the GNSS receiver 110 of a difference in time from when a radio frequency (RF) signal is transmitted from the respective satellite 132 when it is received at the GNSS receiver 110. To help ensure accuracy, not only does the GNSS receiver 110 need to make an accurate determination of when the respective signal from each satellite 130 is received, but many additional factors need to be considered and accounted for. These factors include, for example, clock differences at the GNSS receiver 110 and satellite 130 (e.g., clock bias), a precise location of each satellite 130 at the time of transmission (e.g., as determined by the broadcast ephemeris), the impact of atmospheric distortion (e.g., ionospheric and tropospheric delays), and the like.

To perform a traditional GNSS position fix, the GNSS receiver 110 can use code-based positioning to determine its distance to each satellite 130 based on a determined delay in a generated pseudorandom binary sequence received in the RF signals received from each satellite, in consideration of the additional factors and error sources previously noted. With the distance and location information of the satellites 130, the GNSS receiver 110 can then determine a position fix for its location. This position fix may be determined, for example, by a Standalone Positioning Engine (SPE) executed by one or more processors of the GNSS receiver 110. However, code-based positioning is relatively inaccurate and, without error correction, and is subject to many of the previously described errors. Even so, code-based GNSS positioning can provide an positioning accuracy for the GNSS receiver 110 on the order of meters.

More accurate carrier-based ranging is based on a carrier wave of the RF signals 130 and may use measurements at a base or reference station (not shown) to perform error correction to help reduce errors from the previously noted error sources. More specifically, errors (e.g., atmospheric errors sources) in the carrier-based ranging of satellites 130 observed by the GNSS receiver 110 can be mitigated or canceled based on similar carrier-based ranging of the satellites 130 using a highly accurate GNSS receiver at the base station at a known location. These measurements and the base station's location can be provided to the GNSS receiver 110 for error correction. This position fix may be determined, for example, by a Precise Positioning Engine (PPE) executed by one or more processors of the GNSS receiver 110. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters).

As noted, the accuracy of the GNSS position fix for the GNSS receiver 110 can be reduced if signals from one or more of the satellites 130 experience multipath (MP).

Figure 2:
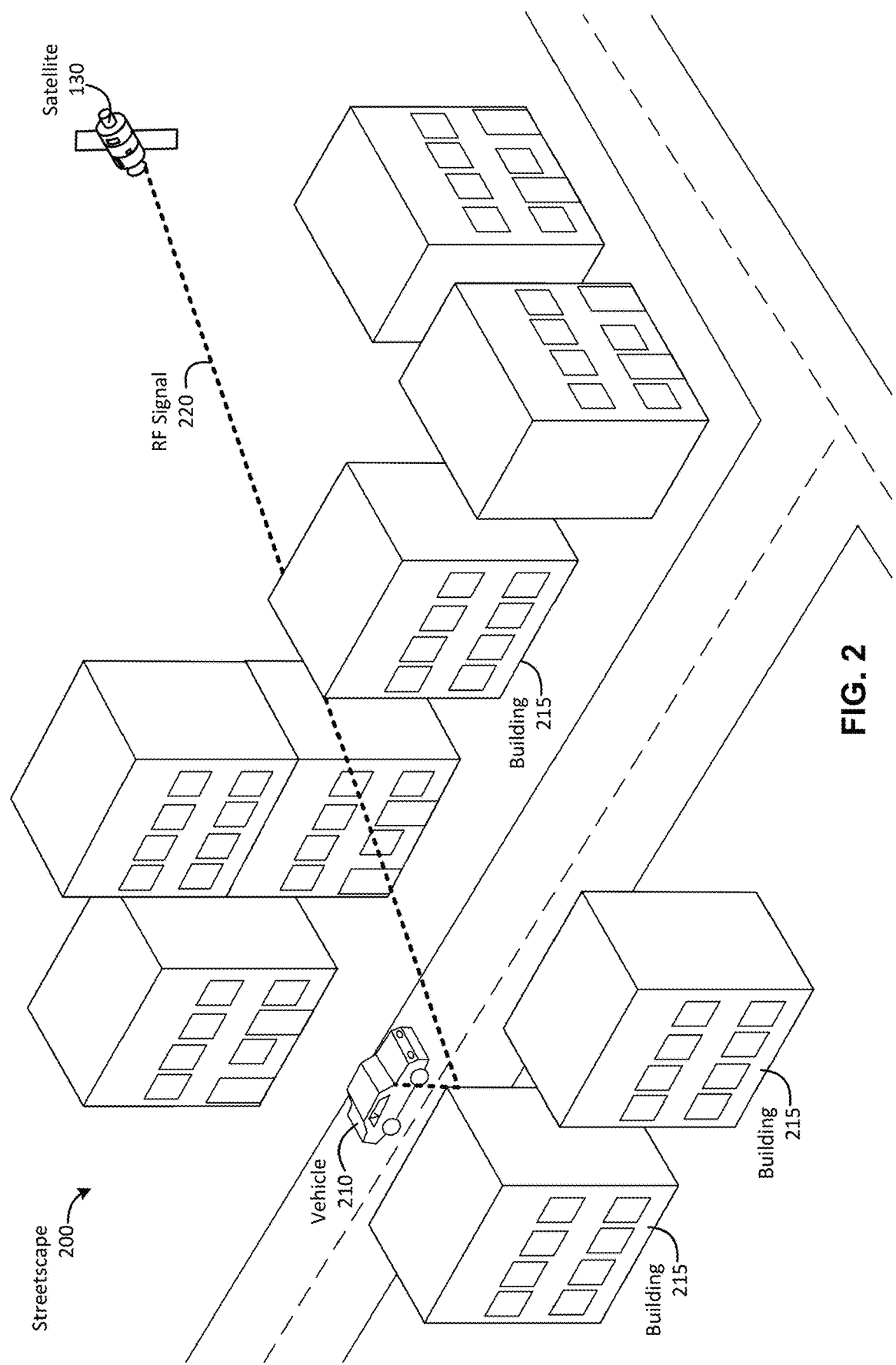
FIG. 2 is a diagram of a city streetscape provided as an example to illustrate the phenomenon of MP.

FIG. 2 is a diagram of a city streetscape 200, provided to help illustrate an example of MP. Here, the city streetscape 200 shows a vehicle 210, buildings 215, and a satellite 130 (the latter of which is, for purposes of discussion, shown in figure relatively close to the streetscape 200). As shown in FIG. 2, the satellite 130 may transmit an RF signal 220 (e.g., providing course acquisition, broadcast ephemeris, precise (P) code). As shown, the RF signal 220 may reflect off of a building 215 (or other object) before reaching a GNSS receiver at the vehicle 210. In practice, portions of the RF signal 220 may reflect off multiple buildings and/or other surfaces before arriving at the vehicle 210, as well as traveling a straight path from the satellite 130 to the vehicle 210.

An RF signal 220 undergoing such MP may results in an inaccurate determination of the pseudorange for the satellite 130. As such, GNSS receivers may be equipped with MP detection subsystems for identifying RF signals 220 experiencing MP. These subsystems may output an MP "flag" to other systems internal to the GNSS receiver (e.g., the SPE or PPE) and/or external to the GNSS receiver, allowing measurements obtained from the RF signal 220 during the MP to be ignored or de-weighed. As noted with regard to FIG. 1, RF signals from many satellites 130 (possibly from multiple GNSS constellations) may be available to a GNSS receiver. In many cases, ignoring measurements of an RF signal 220 experiencing MP and relying on measurements from RF signals of other satellites can result in a more accurate position determination of a GNSS receiver than using the measurements taken from an RF signal 220 experiencing MP.

Figure 3:
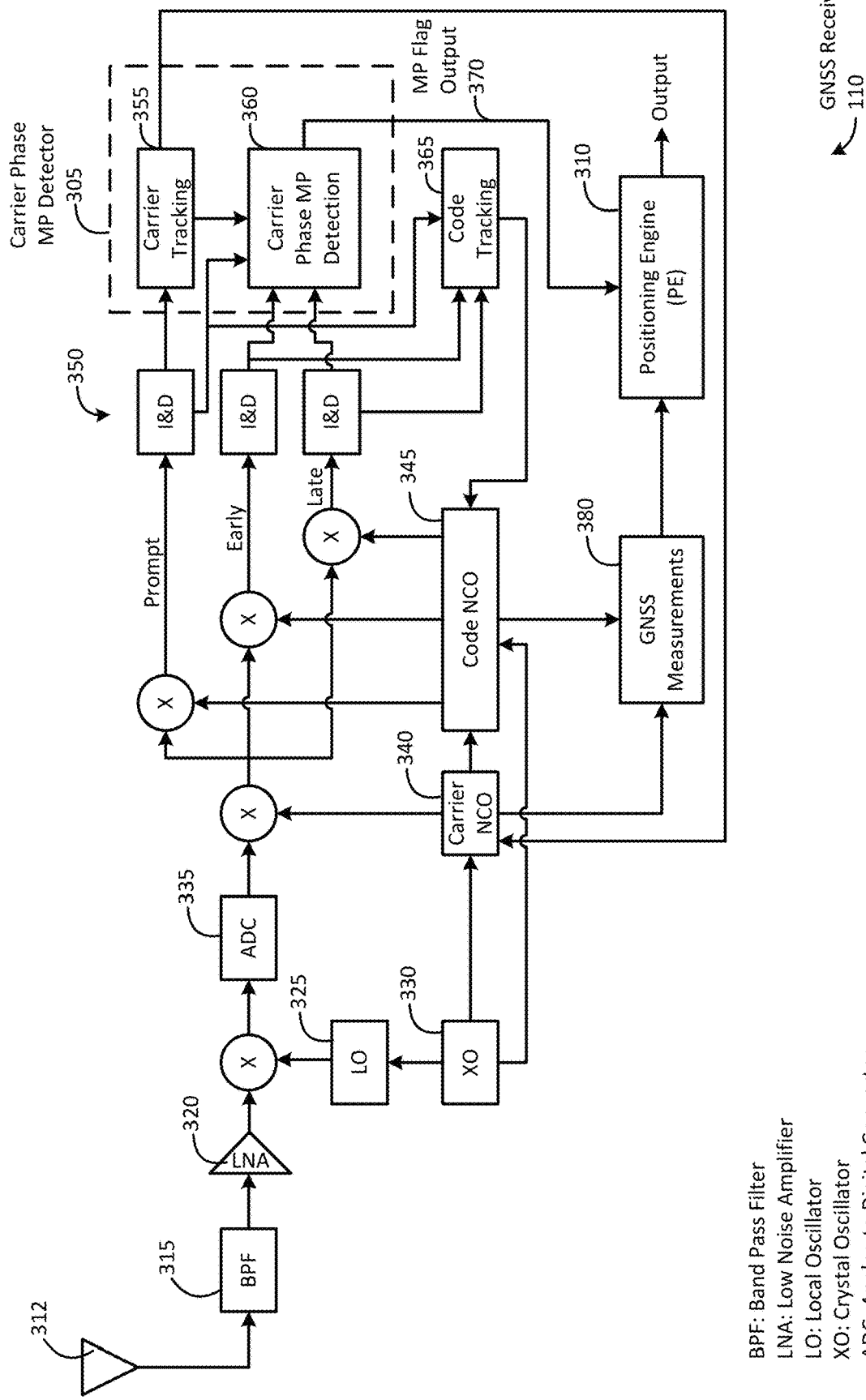
FIG. 3 is a functional block diagram of a GNSS receiver, according to an embodiment.
Figure 7:
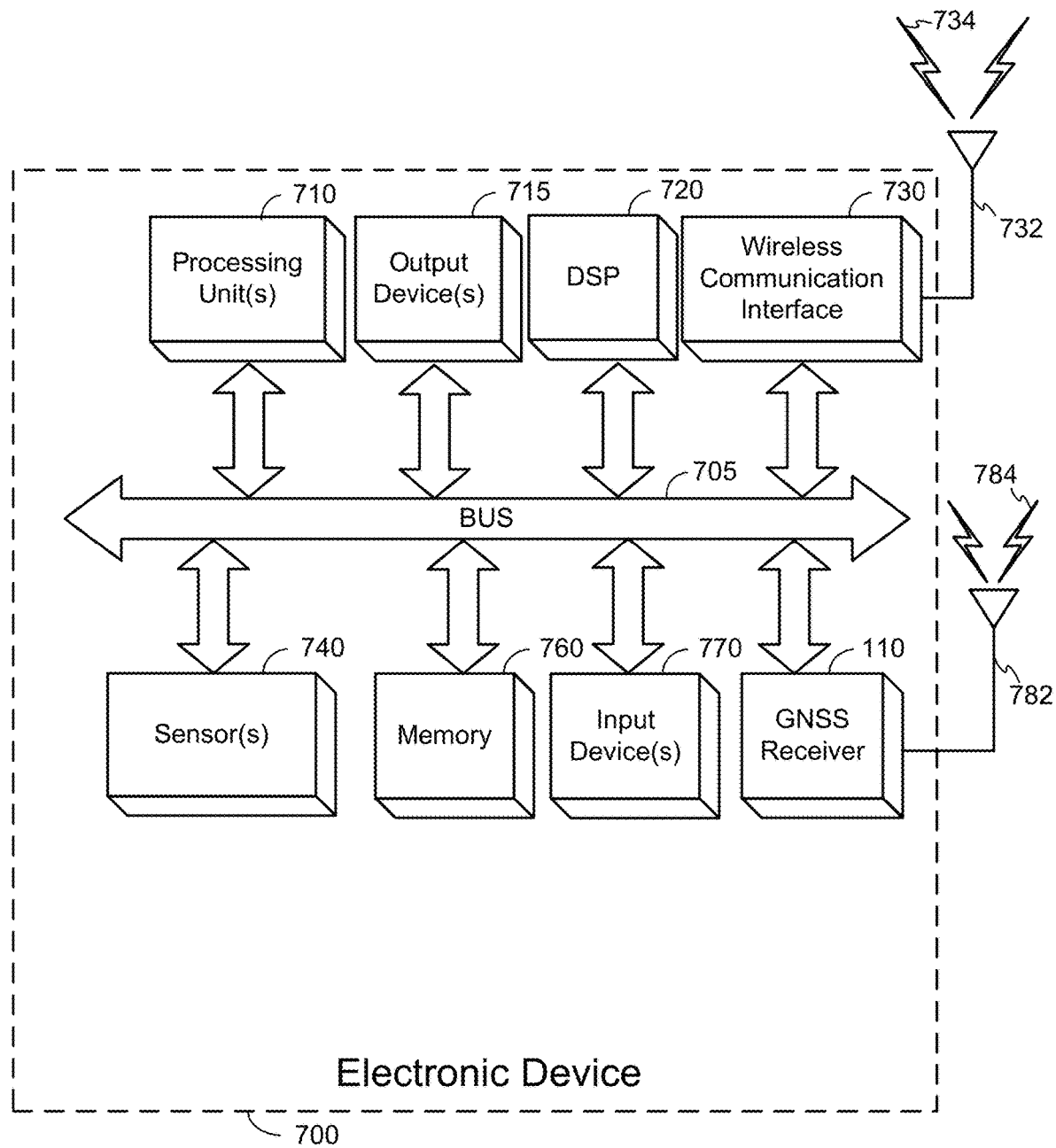
FIG. 7 is a block diagram of an electronic device, which can be utilized as described herein.

FIG. 3 is a functional block diagram of a GNSS receiver 110, according to an embodiment. The various functional components illustrated, including the carrier phase MP detector 305 may be executed by hardware and/or software components of a GNSS receiver 110, which may be incorporated into a larger electronic device, vehicle, etc. An example of an electronic device utilizing a GNSS receiver 110 is illustrated in FIG. 7 and described in more detail below. In some embodiments, the GNSS receiver 110 may comprise a single component or integrated circuit (IC) chip within a larger electronic device, while in other embodiments, the GNSS receiver 110 may comprise a set of components. Some components, such as the positioning engine 310, may be implemented using a chip or device (e.g., processing unit, digital Signal Processor (DSP), etc.) that may be separate from a chip or device implementing the rest of the components in the GNSS receiver 110. For example, the positioning engine 310 may be executed by an application processor of a larger electronic device into which the GNSS receiver 110 is integrated. A person of ordinary skill in the art will appreciate that the illustration provided in FIG. 3 is an example embodiment in various other alternative embodiments of a GNSS receiver may be implemented by rearranging, combining, separating, omitting, adding to, or otherwise changing the various components illustrated in FIG. 3.

Put briefly, an RF signal received at an antenna 312 from a GNSS satellite (e.g., satellite 130) is put through a bandpass filter (BPF) 315 and low noise amplifier (LNA) 320, and down-converted by being mixed with a signal from a local oscillator (LO) 325 to produce an intermediate frequency (IF) signal. Here, a crystal oscillator (XO) 330 can serve as a frequency reference for the LO 325, as well as various other components of the GNSS receiver 300. The IF signal is then provided to an analog to digital converter (ADC) 335, and the output of the ADC 335 is mixed with the output of a carrier frequency numerical controlled oscillator (NCO) 340, bringing the signal to the baseband. Correlation is then performed on the resulting baseband signal by mixing the signal with the output of code NCO 345 using three replica code taps, Early, Prompt, and Late, and performing an integration using Integrate and Dump (I&D) blocks 350. As a person of ordinary skill in the art will appreciate, the integration performed by the I&D blocks 350 may be performed over the code period (e.g., 20 ms), and the sample rate into the I&D blocks 350 may be far shorter (e.g., 1 ms). Depending on desired functionality, Early and Late taps may be offset from the Prompt tap by a fraction of a chip (e.g., half a chip, or 0.5 μs).

The output of the Early, Prompt, and Late integration comprise IQ sums provided to the carrier phase MP detector 305, which performs carrier tracking 355 and carrier phase MP detection 360 as described in more detail below with regard to FIG. 4. Also, as illustrated, the output of the carrier tracking 355 can be used to help tune the carrier frequency of the carrier NCO 340. The outputs of the integration performed at block 350 can also be provided as feedback for code tracking 365 (e.g., a delay-locked loop (DLL)), which is used to tune the code NCO 345.

As illustrated, the carrier NCO 340 also can be used to tune the code NCO 345. The carrier NCO 340 operates at a much higher frequency and tends to be far more accurate (e.g., 10 times more accurate than the code NCO 345). Moreover, the NCO 340 has a fixed relationship with the code NCO. Thus, the carrier NCO 340 can be easily used to provide tuning for the code NCO 345. That said, because ionospheric frequency dispersion can cause divergence in the received RF signal between carrier and code frequencies, code tracking 365 can be further used to correct errors due to this divergence.

Code tracking 365 can be used to detect symmetry between Early, Prompt, and Late IQ sums to help ensure the code NCO 345 is properly tuned. To do so, code tracking 365 can take a difference between Early and Late amplitudes and tune the code NCO 365 to minimize this difference: "steering" the code NCO 345 faster or slower to balance Early and Late amplitudes. The Prompt amplitude can be used to normalize Early and Late amplitudes, providing a reference for the difference in Early and Late amplitudes to determine how much "steering" is needed.

The positioning engine (PE) 310 may comprise an SPE and/or PPE and provide an output indicating an estimated location of the GNSS receiver 110 based on input from GNSS measurements 380. Here, the GNSS measurements 380 comprises a logical block that uses raw measurements from the carrier NCO 340 and code NCO 345 (e.g., carrier Doppler and code phase, respectively) to determine GNSS measurements (e.g., pseudorange, Doppler) for the PE 310. (In some embodiments, the functionality of the GNSS measurements 380 may be incorporated into the PE 310.) As previously indicated, when the PE 310 receives an indication of MP via the MP flag output 370, it may ignore or de-weigh GNSS measurements obtained during the MP. The position of the GNSS receiver 110 provided in the output of the PE 310 may be provided to another device and/or component within a larger device comprising the GNSS receiver 110. For example, the output of the GNSS receiver 110 may be provided to an operating system or application executed by one or more processing units of a mobile device (e.g., mobile phone or vehicle) for purposes of location determination, navigation, etc.

Figure 4:
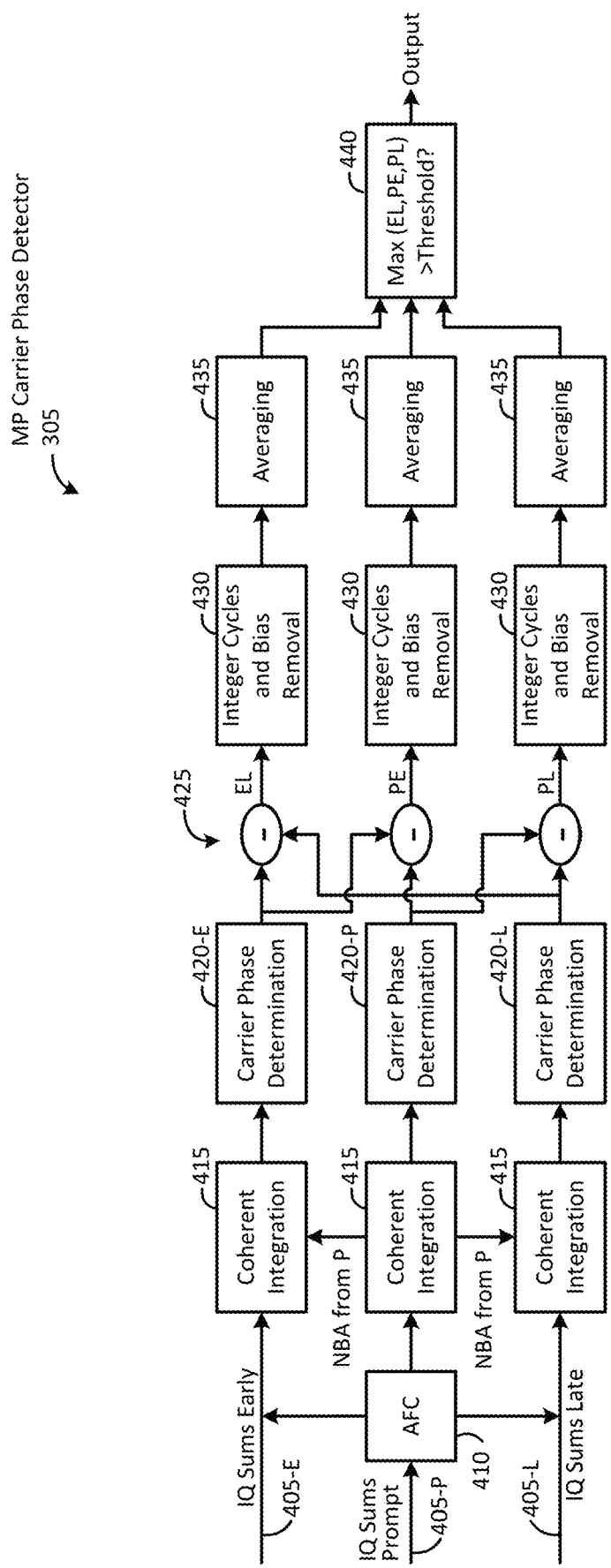
FIG. 4 is a block diagram of an MP carrier phase detector, according to an embodiment.

FIG. 4 is a block diagram of an MP carrier phase detector 305, according to an embodiment. As previously noted, this may be implemented within a larger GNSS receiver 110, as shown in FIG. 3. Accordingly, similar to FIG. 3, the various functional components illustrated in FIG. 4 may be executed by hardware and/or software components of a GNSS receiver 110. Again, an example of an electronic device utilizing a GNSS receiver is illustrated in FIG. 7 and described in more detail below. A person of ordinary skill in the art will appreciate that the illustration provided in FIG. 4 is an example embodiment and alternative embodiments of an MP carrier phase detector 305 may be implemented by rearranging, combining, separating, omitting, adding to, or otherwise changing the various components illustrated in FIG. 4. Some examples of these types of variations are described herein below.

As previously indicated, the MP carrier phase detector 305 receives outputs from EPL correlation. Importantly, outputs Early, Prompt, and Late IQ sums (405-E, 405-P, and 405-L; collectively and generically referred to herein as IQ sums 405) that include a carrier phase component that can be indicative of MP. Mathematically, IQ sums Early 405-E can be expressed as:

$$S_E(t) = \sum_{i=0}^{n} \gamma_i R(x - \delta_i - d/2)\mathrm{sinc}((\Delta f + \Delta f_i)T)e^{j(\Delta \phi_E + \varphi_i)} + \omega_E(t), \quad (1)$$

IQ sums Prompt 405-P can be expressed as:

$$S_P(t) = \sum_{i=0}^{n} \gamma_i R(x - \delta_i)\mathrm{sinc}((\Delta f + \Delta f_i)T)e^{j(\Delta \phi_P + \varphi_i)} + \omega_P(t), \text{ and} \quad (2)$$

IQ sums Late 405-L can be expressed as:

$$S_L(t) = \sum_{i=0}^{n} \gamma_i R(x - \delta_i + d/2)\mathrm{sinc}((\Delta f + \Delta f_i)T)e^{j(\Delta \phi_L + \varphi_i)} + \omega_L(t), \quad (3)$$

where terms for equations (1), (2), and (3), are as follows:
n—the number of MP,
$\gamma_i$—the reflection coefficient,
R—Autocorrelation Function (ACF),
$\delta_i$—path delay in chips,
d—chip spacing between E and L,
sinc—a sinc function,
$\Delta f$—Doppler residual,
$\Delta f_i$—Doppler offset caused by i-th MP,
T—coherent integration time,
$\Delta \phi_E, \Delta \phi_P, \Delta \phi_L$—carrier phase residuals for EPL, respectively,
$\varphi_i$—carrier phase shift caused by MP, and
$\omega_E, \omega_P, \omega_L$—noise for EPL, respectively.
In the case of direct path direct path (i=0): $\gamma_0 = \delta_0 = \Delta f_0 = \omega_0 = 0$.

Traditional techniques for identifying MP have used the ACF (R) of equations (1), (2) and (3) to perform MP detection within a GNSS receiver 110. However, the ACF is in the code domain and often unable to detect MP of less than 100 m. In contrast, embodiments of an MP carrier phase detector 305 can utilize, $\varphi_i$, which is in the carrier phase domain, for carrier-phase-based MP detection. According to embodiments, this type of MP detection can detect MP of as little as 30, 20, 15 m, or less. Moreover, this can be done with relatively low bandwidth/resolution for IQ sums 405. This can keep the cost of manufacturing the GNSS receiver 110 relatively inexpensive when compared with professional-grade GNSS receivers used for survey equipment and other commercial applications (which can currently cost thousands of dollars).

Returning again to the MP carrier phase detector 305 of FIG. 4, carrier phase shift ($\varphi_i$) can be leveraged for MP detection as follows. From the IQ sums 405, an automatic frequency control (AFC) 410 or similar carrier frequency tracking loop can be used for carrier frequency tracking. As such, the AFC 410 (or equivalent) may correspond to the carrier tracking 355 block of FIG. 3. Coherent integration 415 can be performed on the incoming IQ sums 405. As noted, AFC 410 or another type of carrier tracking 355 can be used to measure the Doppler in the RF signal and provide feedback to the carrier NCO 340. Moreover, according to some embodiments, AFC 410 may be implemented using only one of the incoming IQ sums 405, and the measured frequency can be used for other streams, as shown in FIG. 4. Because components of the IQ sums Prompt 405-P may be stronger (e.g., 6 dB stronger) than those of IQ sums Early 405-E and IQ sums Late 405-L, AFC using the Prompt may therefore be more reliable.

The coherent integration 415 may run at a different sample rate than the AFC 410. For example, according to some embodiments, the AFC 410 may be locked on the correlation rate of incoming IQ sums 405 (e.g., 20 ms), and the coherent integration 415 may integrate over several samples. This time period for the coherent integration 415 may vary depending on needs. A longer time period, for example, may reduce the likelihood of detecting faster MP, but may be used to help increase the signal-to-noise ratio (SNR) in situations where signals are weak. For immobile GPS receivers and/or GPS receivers that rarely move (e.g., once every several hours, day, etc.) coherent integration may extend over a long period of time (e.g., 200 ms, 500 ms, etc.) relative to more mobile applications, such as mobile phones or vehicles (e.g., where coherent integration may extend over a period of time to 80 seconds or 100 ms). According to some embodiments, an MP carrier phase detector 305 may be able to dynamically adjust a length of the coherent integration based on conditions (detected movement, signal strength, SNR, etc.). Because coherent integration 415 may cross multiple navigation data bits (e.g., 20 ms bits), Navigation Bit Aiding (NBA) can be used to account for polarity changes in navigation data bits, performing wipe off to help ensure the polarity change does not cancel the power integrated in the coherent integration 415. Again, because components of the IQ sums Prompt 405-P may be stronger than those of IQ sums Early 405-E and IQ sums Late 405-L, NBA using the Prompt may therefore be more reliable. Thus, according to some embodiments, the navigation data bits maybe decoded from the Prompt integration and later used for Early and Late coherent integration.

Differences between Early, Prompt, and Late carrier phases may then be determined. First, the carrier phase ($\varphi_i$) is determined for each of the data streams. More specifically, the phase determination blocks 420-E, 420-P, and 420-L respectively determine Early carrier phase, Prompt carrier phase, and Late carrier phase. At difference determination 425, the differences between Early and Late carrier phases (EL), Prompt and Early carrier phases (PE), and Late and Prompt carrier phases (LP) are each determined.

This can be explained mathematically in the following manner. Prompt carrier phase caused by MP can be expressed as:

$$\delta\Phi_P = \angle S_P - \Delta\phi_P, \quad (4)$$

Early carrier phase caused by MP can be expressed as:

$$\delta\Phi_E = \angle S_E - \Delta\phi_E, \text{ and} \quad (5)$$

Late carrier phase caused by MP can be expressed as:

$$\delta\Phi_L = \angle S_L - \Delta\phi_L, \quad (6)$$

Moreover, because $\Delta\phi_E = \Delta\phi_P = \Delta\phi_L$ for small Doppler error, carrier phase differences may then be expressed as:

$$\angle S_P(i=1) - \angle S_E(i=1) = \delta\Phi_P - \delta\Phi_E, \quad (7)$$

$$\angle S_E(i=1) - \angle S_L(i=1) = \delta\Phi_E - \delta\Phi_L, \text{ and} \quad (8)$$

$$\angle S_P(i=1) - \angle S_L(i=1) = \delta\Phi_P - \delta\Phi_L. \quad (9)$$

As illustrated in these equations, extracting carrier phase differences in this manner can change the information received from IQ sums 405 from the time/code domain to the carrier phase domain. As noted, differences in EPL carrier phases are sensitive to MP at relatively short distances and may therefore be used to detect MP where traditional MP detection techniques fall short. (It should be noted, however, that the MP detection techniques described herein can be used in conjunction with other MP detection techniques.)

Figure 5A:
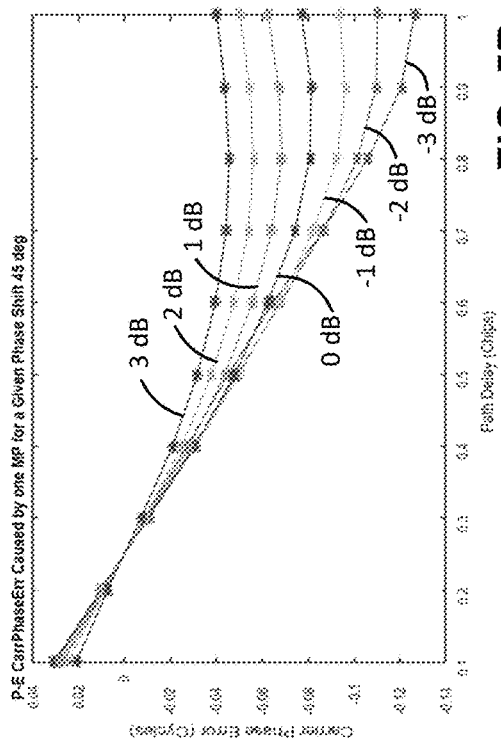
FIG. 5A-5D are graphs illustrating simulated carrier phase error and carrier phase error differences, according to an embodiment.
Figure 5B:
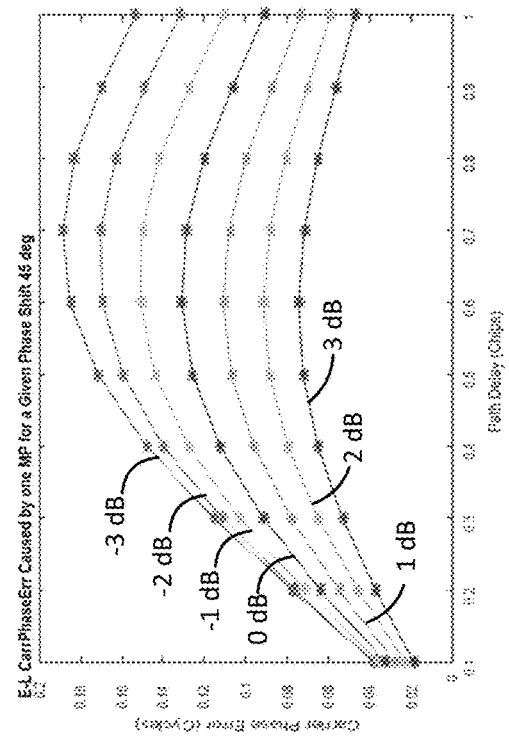
Figure 5C:
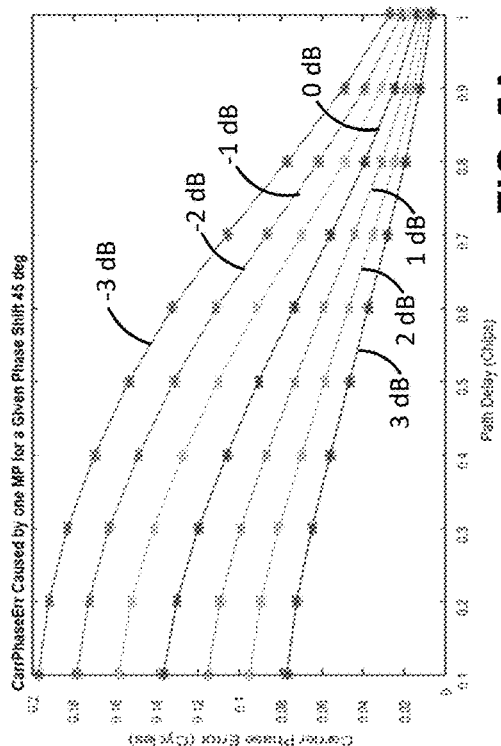
Figure 5D:
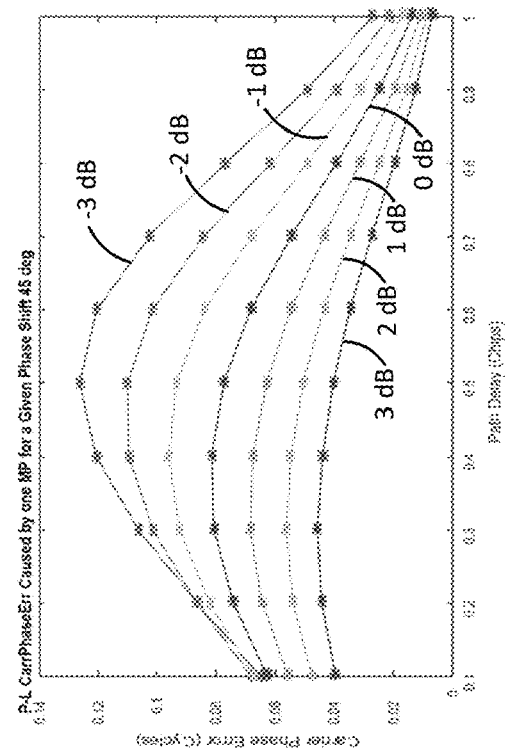

FIGS. 5A-5D are graphs illustrating simulated carrier phase error (FIG. 5A) and carrier phase error differences (FIGS. 5B-5D) for one MP with a 45° phase shift, provided to help illustrate how phase error and phase error differences can vary over different path delay, according to an embodiment. In these graphs, carrier phase error in cycles is plotted over path delay over chips, for various amounts of attenuation ranging from −3 dB to 3 dB (as labeled in the graphs). The carrier phase difference between Prompt and Early (PE) is illustrated in FIG. 5B, the carrier phase difference between Prompt and Late (PL) is illustrated in FIG. 5C, and the carrier phase difference between Early and Late (EL) is illustrated in FIG. 5D.

Different features with regard to carrier phase differences may be noted. First, the magnitude of carrier phase differences may be sensitive to many factors such as the amount of delay, non-line-of-sight (NLOS) to line-of-sight (LOS) power ratio, carrier phase offset, and Doppler offset. Second, in some conditions, path delay may not cause detectable carrier phase difference. As seen in the graph of FIG. 5B, for example, no carrier phase error is detected for difference PE at a path delay of approximately 0.25 chips. However, as indicated below, because embodiments may detect MP based on the maximum of PE, PL, and EL, embodiments may still detect MP in such instances. Finally, carrier phase error may not be proportional to path delay. In fact, FIG. 5A illustrates how carrier phase error may be the opposite, showing larger carrier phase error with shorter path delay.

Returning again to FIG. 4, carrier phase differences may then undergo integer cycle and bias removal 430, as well as averaging 435. Integer cycles do not affect phase can therefore be removed, while preserving fractional cycles with phase information. Bias removal may comprise removal of carrier phase biases not caused by MP, such as an internal bias caused by a mismatch frequency spectrum mismatch between front and filtering and equalizer filtering, or and external bias because by ionosphere layer frequency dispersion. Accordingly, such bias removal may rely on carrier phase calibration. Carrier phase biases may be the same among all GNSS receivers of a certain type (e.g., a particular GNSS receiver chip), biases for different receiver types can be kept in a lookup table the software of the GNSS receiver and used to remove systematic biases in the carrier phase.

Averaging 435 can take place over a plurality of samples of carrier phase differences to help improve SNR. The length of the averaging 435 may vary, depending on desired functionality. In some embodiments, averaging may take place over as few as two samples, whereas in other embodiments it could take place over a large number of samples (e.g., five or more). An embodiment in which coherent integration 415 occurs at an 80 ms rate, averaging 435 of three samples would result in averaging over 240 ms window.

It can be noted that in alternative embodiments, difference determination 425, integer cycles and bias removal 430, and averaging 435 may be rearranged with respect to each other. In some embodiments, for example, averaging 435 and integer cycles and bias removal 430 may occur prior to difference determination 425. A person of ordinary skill in the art will recognize other such variations.

As previously noted, MP can be determined based on the maximum of carrier phase differences PE, PL, and EL, which occurs at block 440. The threshold used at block 440 can be set to account for MP detection and probability of false alarm (PFA). To this end, the threshold may be determined, for example, using a Monte Carlo simulation. For example, in an embodiment, a threshold of 0.038 cycles was determined using a design point of 27 dBHz with a PFA of approximately $1 \times 10^{-4}$. Setting a fixed threshold in this manner results in a varying PFA: if signal strength is lower than 27 dBHz, PFA will be larger; and if signal strength is higher than 27 dBHz, PFA will be smaller. This type of implementation can be used to help ensure stronger signals can result in a higher-confidence MP detection, which is often desirable in GNSS receiver designs. That said, other implementations may utilize a variable threshold (e.g., set as a function of carrier to noise power density ratio (CNo)) which can be used to ensure a fixed PFA.

Because a PFA resulting from the threshold comparison in block 440 may be relatively high, some embodiments of an MP carrier phase detector 305 may employ additional techniques for reducing PFA. For example, according to some embodiments, the output of block 440 may be provided to a k-out-of-N system (not shown). The k-out-of-N system can then provide indicate MP detection at the output of the MP carrier phase detector if the results of the comparison at block 440 were true for a specified number (k) of the last N comparisons made at block 440 (e.g., the threshold is exceeded for 2 out of the last 3 comparisons, 3 out of the last 5 comparisons, etc.). Alternatively, an indication of MP detection can be made if the threshold is exceeded at block 440 for a consecutive number (e.g., 3, 4, 5, etc.) of comparisons. These techniques for reducing PFA may be used with averaging 435. However, unlike averaging, they may preserve detail unattainable by averaging.

Figure 6:
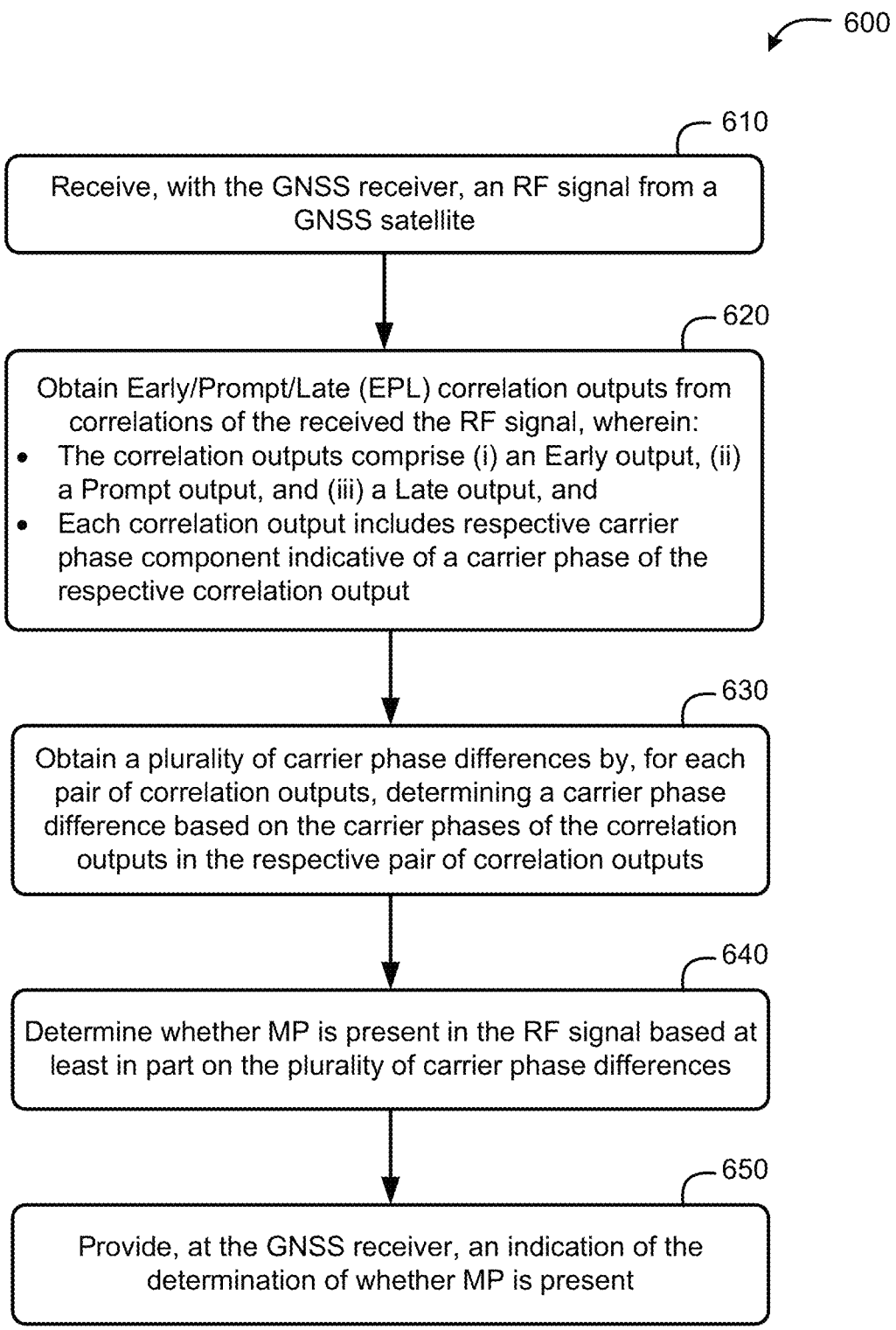
FIG. 6 is a flow diagram of a method of MP detection in a GNSS receiver, according to an embodiment.

FIG. 6 is a flow diagram of a method 600 of MP detection in a GNSS receiver, according to an embodiment. Alternative embodiments of the method 600 may vary in function by combining, separating, or otherwise varying the functionality described in the blocks illustrated in FIG. 6. The functionality of one or more of the blocks illustrated in FIG. 6 may be performed by one or more functional blocks of an MP carrier phase detector 305, as illustrated in FIG. 4. Thus, means for performing these functions may comprise hardware and/or software components of an electronic device, such as the electronic device 700 illustrated in FIG. 7 and described in more detail below.

At block 610, the functionality comprises receiving, with the GNSS receiver, and RF signal from a GNSS satellite. As previously discussed with regard to FIG. 3, this RF signal may comprise positioning information from the GNSS satellite and may be subject to MP. The RF signal may be received at an antenna and processed by a BPF 315, LNA 320, and/or other RF front-end components (e.g., LO 325, ADC 335, and a mixer) to convert the signal to an intermediate frequency IF.

At block 620, the functionality comprises obtaining EPL correlation outputs from correlations of the received the RF signal, wherein the correlation outputs comprise (i) an Early output, (ii) a Prompt output, and (iii) a Late output, and each correlation output includes respective carrier phase component indicative of a carrier phase of the respective correlation output. As noted, outputs from a carrier NCO 340 and code in CO 345 be mixed with the incoming IF signal and processed by I&D blocks 350 to perform EPL correlation. EPL correlation may be used for code-based MP detection and/or code tracking, in addition to carrier phase MP detection using the techniques described herein.

At block 630, the functionality comprises obtaining a plurality of carrier phase differences by, for each pair of correlation outputs, determining a carrier phase difference based on the carrier phases of the correlation outputs in the respective pair of correlation outputs. As previously described and illustrated in FIG. 4, carrier phase differences (e.g., EL, PE, and PL) are calculated from Early, Prompt, and Late correlation inputs after carrier phase determination 420, and may take place before or after averaging 435 and/or integer cycles and bias removal 430. Accordingly, some embodiments may comprise determining the carrier phase difference for each pair of correlation outputs is based on averaging the plurality of samples for each correlation output of the respective pair of correlation outputs. Additionally or alternatively, embodiments may comprise removing integer cycles and/or carrier phase bias (e.g., from internal and/or external error sources, as shown at block 430) from the correlation outputs based at least in part on a frequency measured by the AFC. As noted, according to some embodiments, this may take place prior to obtaining the plurality of carrier phase differences.

At block 640, the method 600 comprises determining whether MP is present in the RF signal based at least in part on the plurality of carrier phase differences. As previously described, this determination may be based on whether a maximum carrier phase difference of the plurality of carrier phase differences exceeds a threshold (e.g., the functionality of block 440 in FIG. 4). Some embodiments may further reduce PFA by implementing a k-out-of-N or similar system. For example, some embodiments may provide an indication that MP is present based on a determination that the maximum carrier phase difference of the plurality of carrier phase differences exceeded the threshold a predetermined number of consecutive times.

At block 650, an indication of the determination of whether MP is present is provided at the GNSS receiver. This indication may be internal and/or external to the GNSS receiver, depending on desired functionality. For example, as shown in FIG. 3, this may be provided via an MP flag output 370 to a positioning engine 310. Additionally or alternatively, embodiments may provide an MP flag output or similar indication of detected MP to a processor or device external to the GNSS receiver 110.

As indicated in the previously-described embodiments, techniques for carrier phase-based MP detection may include any of a variety of additional features, depending on desired functionality. For example, and as shown in FIG. 4, embodiments of the method 600 may further comprise implementing a carrier frequency tracking loop (e.g., AFC) based on at least one of the correlation outputs, coherently integrating the correlation outputs (e.g., coherent integration 415) prior to obtaining the plurality of carrier phase differences, and, for each correlation output, determining the respective carrier phase (e.g., carrier phase determination 420) based on the coherent integration of the respective correlation output. Moreover, according to some embodiments, the carrier frequency tracking loop and coherent integration run at different rates. For example, in some embodiments the carrier frequency tracking loop may run at 20 ms, whereas the coherent integration rates may be for periods of 80 ms or more.

NBA may be used to help ensure polarity changes in navigation bits do not impact coherent integration. As such, according to some embodiments of the method 600, the coherent integration extends across multiple navigation bits, and the method further comprises decoding the navigation bits from the Prompt output, and providing NBA in the integration of the Early output and Late output based on the decoded navigation bits from the Prompt output.

Finally, according to some embodiments, carrier phase differences can be used to detect additional or alternative error sources to MP. As noted, carrier phase can be impacted by internal and/or external biases. Internal biases include a mismatch between the frequency response of the RF front-end and equalizer components of a GNSS receiver 110. An external bias can result from ionospheric frequency dispersion. Thus, either or both of these additional biases can be identified using techniques similar to the MP detection described herein. For example, if no MP is present but carrier phase differences exceed a certain threshold, it may be indicative of ionospheric dispersion (if the GNSS receiver has been calibrated to balance the frequency response for RF front end and equalizer components). On the other hand, if no MP is present and no ionospheric dispersion is detected, carrier phase differences can be used to balance the frequency response between RF front end and equalizer components. Thus, according to some embodiments, the method may further comprise determining a frequency response distortion associated with the RF signal based at least in part on the plurality of carrier phase differences, and providing, at the GNSS receiver, an indication of the determination of the frequency response distortion.

FIG. 7 is a block diagram of an electronic device 700, which can be utilized as described herein above (e.g. in association with FIGS. 1-6). For example, the electronic device 700 can perform one or more of the functions of method 400 of FIG. 4. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations (e.g., located at different parts of a user's body, different locations on a vehicle, etc.).

Generally put, the electronic device 700, may comprise any of a variety of types of electronic devices, including, but not limited to, a mobile device, a wireless device, a mobile terminal, a terminal, a wireless terminal, a user equipment (UE), a mobile station (MS), a Secure User Plane Location (SUPL) Enabled Terminal (SET), or by some other name. Moreover, electronic device 700 may correspond to a cellphone, smartphone, laptop, tablet, personal data assistant (PDA), tracking device, wearable device, Internet of Things (IoT) device, or some other portable or moveable device. In some cases, the electronic device 700 may be part of some other entity—e.g., may be a chipset supporting a modem that is integrated into some larger mobile entity such as a vehicle, drone, package, shipment, robotic device, etc.

The electronic device 700 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 7, some embodiments may have a separate Digital Signal Processor (DSP) 720, depending on desired functionality. Location determination and/or other determinations based on wireless communication may be provided in the processing unit(s) 710 and/or wireless communication interface 730 (discussed below). The electronic device 700 also can include one or more input devices 770, which can include without limitation a keyboard, touch screen, a touch pad, microphone, button(s), dial(s), switch(es), and/or the like; and one or more output devices 715, which can include without limitation a display, light emitting diode (LED), speakers, and/or the like.

The electronic device 700 may also include a wireless communication interface 730, which may comprise without limitation a separate receiver and transmitter, or any combination of transceivers, transmitters, and/or receivers, which may be used with a modem, a network card, an infrared communication device, a wireless communication device, and/or a chipset, and/or the like for wireless communications. In some embodiments, the electronic device 700 can support wireless communication under the 5th Generation New Radio (5G NR) standard. That said, the electronic device 700 may support wireless communication using one or more additional Radio Access Technologies (RATs) such as Global System for Mobile communication (GSM), Code Division Multiple Access (CDMA), Wideband CDMA (WCDMA), Long Term Evolution (LTE), High Rate Packet Data (HRPD), IEEE 802.11 Wi-Fi, Bluetooth® (BT), Worldwide Interoperability for Microwave Access (WiMAX), etc. The electronic device 700 may also support wireless communication using a Wireless Local Area Network (WLAN) which may connect to other networks (e.g. the Internet). As such, the wireless communication interface 730 may permit data and signaling to be communicated with a network, for example, via access points, base stations, and/or other access node types, and/or other network components, computer systems, and/or any other electronic devices described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof.

The electronic device 700 can further include sensor(s) 740. Sensors 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the electronic device 700 may also include a GNSS receiver 110, which may be used as described herein, and which may include internal hardware and/or software components to implement the various functional aspects of a GNSS receiver 110 illustrated in FIGS. 3 and 4. Accordingly, the GNSS receiver 110 may be capable of receiving signals 784 from one or more satellites 130 using an antenna 782 (which may correspond to antenna 312 of FIG. 3 and could be the same as antenna 732). As noted, the GNSS receiver 110 can determine a position of the electronic device 700 using conventional techniques, from satellites of one or more GNSS constellations (e.g., GPS, Galileo, etc.), and be used with various augmentation systems.

The electronic device 700 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the electronic device 700 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the electronic device 700 (and/or processing unit(s) 710 or DSP 720 within electronic device 700). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a Programmable ROM (PROM), Erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of multipath (MP) detection in a Global Navigation Satellite System (GNSS) receiver, the method comprising:
   receiving, with the GNSS receiver, a radio frequency (RF) signal from a GNSS satellite;
   obtaining Early/Prompt/Late (EPL) correlation outputs from correlations of the received the RF signal, wherein:
      the correlation outputs comprise (i) an Early output, (ii) a Prompt output, and (iii) a Late output, and
      each correlation output includes respective carrier phase component indicative of a carrier phase of the respective correlation output;
   implementing a carrier frequency tracking loop based on at least one of the correlation outputs;
   coherently integrating the correlation outputs;
   for each correlation output, determining the respective carrier phase based on the coherent integration of the respective correlation output;
   subsequent to determining the respective carrier phase for each correlation output, removing integer cycles from the correlation outputs based at least in part on a frequency measured by the carrier frequency tracking loop;
   subsequent to coherently integrating the correlation outputs, obtaining a plurality of carrier phase differences by, for each pair of correlation outputs, determining a carrier phase difference based on the carrier phases of the correlation outputs in the respective pair of correlation outputs;
   determining whether MP is present in the RF signal based at least in part on the plurality of carrier phase differences; and
   providing, at the GNSS receiver, an indication of the determination of whether MP is present.

2. The method of claim 1, wherein the carrier frequency tracking loop and the coherent integration run at different rates.

3. The method of claim 1, wherein the coherent integration extends across multiple navigation bits, further comprising:
   decoding the navigation bits from the Prompt output; and
   providing Navigation Bit Aiding (NBA) in the integration of the Early output and Late output based on the decoded navigation bits from the Prompt output.

4. The method of claim 1, further comprising, wherein removing the integer cycles from the correlation outputs occurs prior to obtaining the plurality of carrier phase differences.

5. The method of claim 1, further comprising, removing carrier phase bias from the correlation outputs.

6. The method of claim 1, wherein determining whether MP is present in the RF signal comprises determining whether a maximum carrier phase difference of the plurality of carrier phase differences exceeds a threshold.

7. The method of claim 6, further comprising providing an indication that MP is present based on a determination that the maximum carrier phase difference of the plurality of carrier phase differences exceeded the threshold a predetermined number of consecutive times.

8. The method of claim 1, wherein determining the carrier phase difference for each pair of correlation outputs is based on averaging a plurality of samples for each correlation output of the respective pair of correlation outputs.

9. The method of claim 1, further comprising:
   determining a frequency response distortion associated with the RF signal based at least in part on the plurality of carrier phase differences; and
   providing, at the GNSS receiver, an indication of the determination of the frequency response distortion.

10. A Global Navigation Satellite System (GNSS) receiver comprising:
   an antenna configured to receive a radio frequency (RF) signal from a GNSS satellite;
   one or more Early/Prompt/Late (EPL) correlators configured to provide correlation outputs from correlations of the received the RF signal, wherein:
      the correlation outputs comprise (i) an Early output, (ii) a Prompt output, and (iii) a Late output, and
      each correlation output includes respective carrier phase component indicative of a carrier phase of the respective correlation output; and
   a carrier phase multipath (MP) detector comprising:
      a carrier frequency tracking loop configured to track a frequency of at least one of the correlation outputs; and
      one or more coherent integrators configured to coherently integrate the correlation outputs;
   wherein the carrier phase MP detector is configured to:
      for each correlation output, determine the respective carrier phase based on the coherent integration of the respective correlation output;
      remove integer cycles from the correlation outputs based at least in part on a frequency measured by the carrier frequency tracking loop;
      subsequent to coherently integrating the correlation outputs, obtain a plurality of carrier phase differences by, for each pair of correlation outputs, determining a carrier phase difference based on the carrier phases of the correlation outputs in the respective pair of correlation outputs;
      determine whether MP is present in the RF signal based at least in part on the plurality of carrier phase differences; and
      provide an indication of the determination of whether MP is present.

11. The GNSS receiver of claim 10, wherein the one or more EPL correlators, the carrier phase MP detector, or both, are implemented using one or more processing units.

12. The GNSS receiver of claim 10, wherein the carrier frequency tracking loop and the one or more coherent integrators run at different rates.

13. The GNSS receiver of claim 10, wherein the one or more coherent integrators are configured to:
   perform coherent integration across multiple navigation bits;
   decode the navigation bits from the Prompt output; and
   provide Navigation Bit Aiding (NBA) in the integration of the Early output and Late output based on the decoded navigation bits from the Prompt output.

14. The GNSS receiver of claim 10, wherein the carrier phase MP detector is further configured to remove the integer cycles from the correlation outputs prior to obtaining the plurality of carrier phase differences.

15. The GNSS receiver of claim 10, wherein the carrier phase MP detector is further configured to remove carrier phase bias from the correlation outputs.

16. The GNSS receiver of claim 10, wherein, to determine whether MP is present in the RF signal, the carrier phase MP detector is configured to determine whether a maximum carrier phase difference of the plurality of carrier phase differences exceeds a threshold.

17. The GNSS receiver of claim 16, wherein the carrier phase MP detector is further configured to provide an indication that MP is present based on a determination that the maximum carrier phase difference of the plurality of carrier phase differences exceeded the threshold a predetermined number of consecutive times.

18. The GNSS receiver of claim 10, wherein the carrier phase MP detector is configured to determine the carrier phase difference for each pair of correlation outputs based on averaging a plurality of samples for each correlation output of the respective pair of correlation outputs.

19. The GNSS receiver of claim 10, wherein the carrier phase MP detector is configured to:
   determine a frequency response distortion associated with the RF signal based at least in part on the plurality of carrier phase differences; and
   provide an indication of the determination of the frequency response distortion.

20. A device for providing (MP) detection in a Global Navigation Satellite System (GNSS) receiver, the device comprising:
   means for receiving a radio frequency (RF) signal from a GNSS satellite;
   means for obtaining Early/Prompt/Late (EPL) correlation outputs from correlations of the received the RF signal, wherein:
      the correlation outputs comprise (i) an Early output, (ii) a Prompt output, and (iii) a Late output, and
      each correlation output includes respective carrier phase component indicative of a carrier phase of the respective correlation output;
   means for implementing a carrier frequency tracking loop based on at least one of the correlation outputs;
   means for coherently integrating the correlation outputs;
   for each correlation output, determining the respective carrier phase based on the coherent integration of the respective correlation output;
   means for removing integer cycles from the correlation outputs, subsequent to determining the respective carrier phase for each correlation output, based at least in part on a frequency measured by the carrier frequency tracking loop;
   means for, subsequent to coherently integrating the correlation outputs, obtaining a plurality of carrier phase differences by, for each pair of correlation outputs, determining a carrier phase difference based on the carrier phases of the correlation outputs in the respective pair of correlation outputs;
   means for determining whether MP is present in the RF signal based at least in part on the plurality of carrier phase differences; and
   means for providing an indication of the determination of whether MP is present.

21. The device of claim 20, wherein the carrier frequency tracking loop and the coherent integration run at different rates.

22. The device of claim 20, wherein the coherent integration extends across multiple navigation bits, further comprising:
   means for decoding the navigation bits from the Prompt output; and
   means for providing Navigation Bit Aiding (NBA) in the integration of the Early output and Late output based on the decoded navigation bits from the Prompt output.

23. The device of claim 20, wherein the means for removing the integer cycles from the correlation outputs are configured to do so prior to obtaining the plurality of carrier phase differences.

24. The device of claim 20, wherein the means for determining whether MP is present in the RF signal comprises means for determining whether a maximum carrier phase difference of the plurality of carrier phase differences exceeds a threshold.

25. The device of claim 20, wherein the means for determining the carrier phase difference for each pair of correlation outputs is configured to determine the carrier phase difference based on averaging a plurality of samples for each correlation output of the respective pair of correlation outputs.

26. The device of claim 20, further comprising:
   means for determining a frequency response distortion associated with the RF signal based at least in part on the plurality of carrier phase differences; and
   means for providing, at the GNSS receiver, an indication of the determination of the frequency response distortion.

27. A non-transitory computer-readable medium having instructions stored thereby for multipath (MP) detection in a Global Navigation Satellite System (GNSS) receiver, wherein the instructions, when executed by one or more processing units, cause the one or more processing units to perform functions including:
   obtaining Early/Prompt/Late (EPL) correlation outputs from correlations of an RF signal received at the GNSS receiver, wherein:
      the correlation outputs comprise (i) an Early output, (ii) a Prompt output, and (iii) a Late output, and
      each correlation output includes respective carrier phase component indicative of a carrier phase of the respective correlation output;
   implementing a carrier frequency tracking loop based on at least one of the correlation outputs;
   coherently integrating the correlation outputs;
   for each correlation output, determining the respective carrier phase based on the coherent integration of the respective correlation output;
   subsequent to determining the respective carrier phase for each correlation output, removing integer cycles from the correlation outputs based at least in part on a frequency measured by the carrier frequency tracking loop;
   subsequent to coherently integrating the correlation outputs, obtaining a plurality of carrier phase differences by, for each pair of correlation outputs, determining a carrier phase difference based on the carrier phases of the correlation outputs in the respective pair of correlation outputs;
   determining whether MP is present in the RF signal based at least in part on the plurality of carrier phase differences; and
   providing, at the GNSS receiver, an indication of the determination of whether MP is present.

* * * * *